Figure 1:
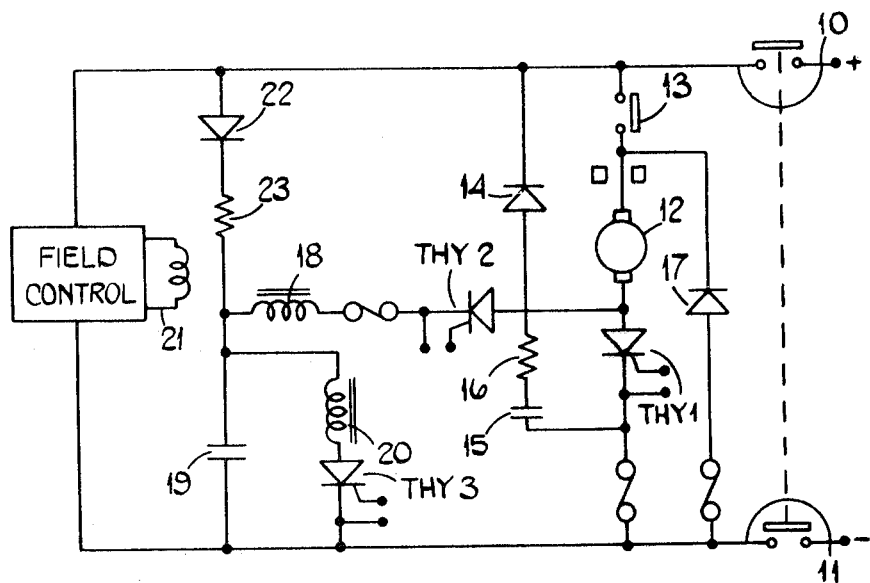

United States Patent [19]

Boxer

[11] 4,246,519
[45] Jan. 20, 1981

[54] D.C. MOTOR CONTROL FOR AN ELECTRICALLY POWERED VEHICLE

[75] Inventor: Trevor C. Boxer, Birmingham, England

[73] Assignee: Lucas Industries Limited, Birmingham, England

[21] Appl. No.: 55,237

[22] Filed: Jul. 6, 1979

Related U.S. Application Data

[63] Continuation of Ser. No. 847,283, Oct. 31, 1977, abandoned.

[30] Foreign Application Priority Data

Nov. 2, 1976 [GB] United Kingdom ............... 45460/76

[51] Int. Cl.³ .............................................. H02P 5/16
[52] U.S. Cl. ................................ 318/139; 318/345 C; 318/345 G
[58] Field of Search ............... 318/139, 345 C, 345 G; 307/252 M; 363/124, 135, 136

[56] References Cited

U.S. PATENT DOCUMENTS

| | | | |
|---|---|---|---|
| 3,530,503 | 9/1970 | Appelo et al. | 363/124 |
| 3,629,673 | 12/1971 | Thorborg | 363/124 |
| 3,665,286 | 5/1972 | Ohno et al. | 363/124 |
| 3,753,077 | 8/1973 | Anderson et al. | 363/124 |
| 4,066,939 | 1/1978 | Joyes | 318/139 |

*Primary Examiner*—David Smith, Jr.
*Attorney, Agent, or Firm*—Ladas & Parry

[57] ABSTRACT

A d.c. motor control circuit includes an armature current chopper including a main thyristor, a commutating thyristor for turning off the main thyristor by diverting the armature current into a commutating capacitor and a third thyristor connected to reverse the voltage on the capacitor. There is a charging path for the capacitor to keep it charged up to the voltage it reaches on commutation and the firing circuits for the thyristors are arranged to ensure that the third thyristor is fired a fixed period before the commutating thyristor. This ensures that there is an adequate reverse voltage on the capacitor for correct commutation to occur.

4 Claims, 4 Drawing Figures

D.C. MOTOR CONTROL FOR AN ELECTRICALLY POWERED VEHICLE

This is a continuation of application Ser. No. 847,283, filed Oct. 31, 1977, now abandoned.

This invention relates to d.c. motor control for an electrically powered vehicle, such as a battery powered road vehicle. The invention is more particularly concerned with motor controls in which separate control arrangements are provided for the armature and the field winding of the motor.

In a conventional armature current control for such a motor it is known to use a three thyristor circuit arrangement with a main thyristor in series with the armature between a pair of supply rails, a commutating thyristor in series with a first inductor and a capacitor in a circuit connected across the main thyristor and a third thyristor connected in series with a second inductor across the capacitor. Conventionally the main thyristor and the third thyristor are connected to a common firing control and a separate firing control is connected to the second thyristor. In use the common firing control is triggered when conduction through the armature is required to commence and the separate firing control is triggered when conduction is required to cease.

Such an arrangement is quite adequate in a control where it is necessary to keep interrupting the armature current to maintain an average armature current lower than the maximum possible at a given motor speed and field current. With a battery vehicle system, however, circumstances will frequently arise where it is desirable for the armature to be energised continuously, to ensure smooth and silent control of power.

In such circumstances, the reverse charge which is impressed on the capacitor by firing of the third thyristor can leak away over a period so that when the commutating thyristor is eventually fired, there is insufficient charge on the capacitor entirely to divert the armature current from the main thyristor so that the main thyristor does not switch off.

It has been proposed in the past to overcome this problem by imposing a maximum on-time limitation on the main thyristor so that the armature current is always interrupted after a predetermined time. This, however, inevitably reduces the overall efficiency of system and it is an object of the invention to provide an alternative solution to the problem in which system efficiency is not significantly reduced.

In accordance with the invention there is provided a control circuit for a d.c. motor comprising a field current control and an armature current control, the armature current control comprising a main thyristor connected in series with the armature between a pair of supply terminals, a commutating thyristor, a first inductor and a capacitor connected in series across the main thyristor, a third thyristor connected in series with a second inductor across the capacitor and firing circuit means for the thyristors, characterised in that the firing circuit means includes separate firing circuits for the three thyristors, the firing circuit for the commutating thyristor contains a delay circuit connected to the firing circuit for the third thyristor so that the commutating thyristor is fired a predetermined time after the third thyristor, and charging path means is provided for the capacitor to maintain the voltage across it at a level not significantly less than that between the supply terminals.

With such an arrangement, the first thyristor alone is fired when it is desired to increase the current flowing in the armature and the third thyristor is fired when a reduction in current is required. This causes the voltage on the capacitor to be reversed so that when the commutating capacitor is fired after the fixed delay commutation is assured.

An example of the invention is shown in the accompanying drawings in which

Figure 2:
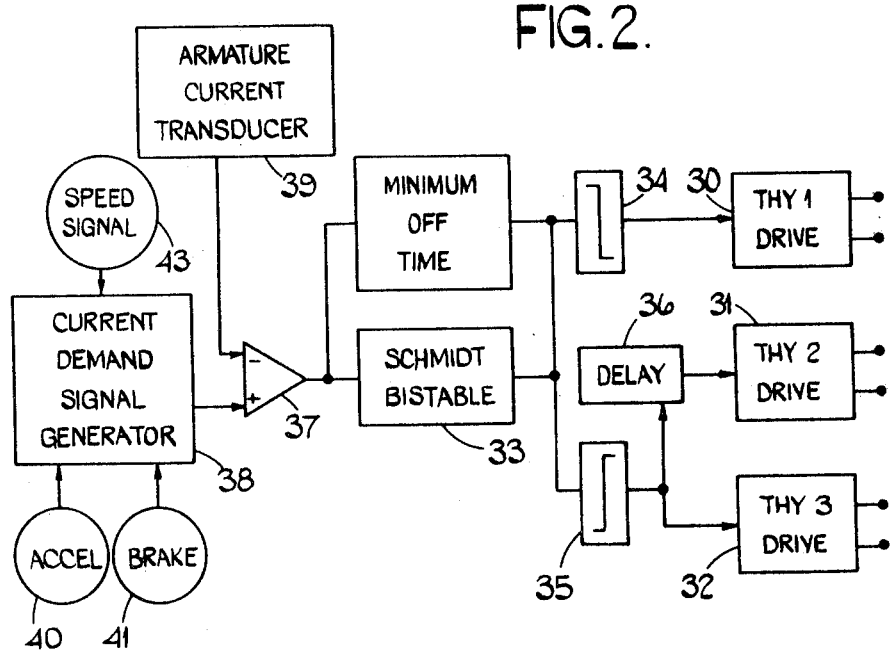
Figure 3:
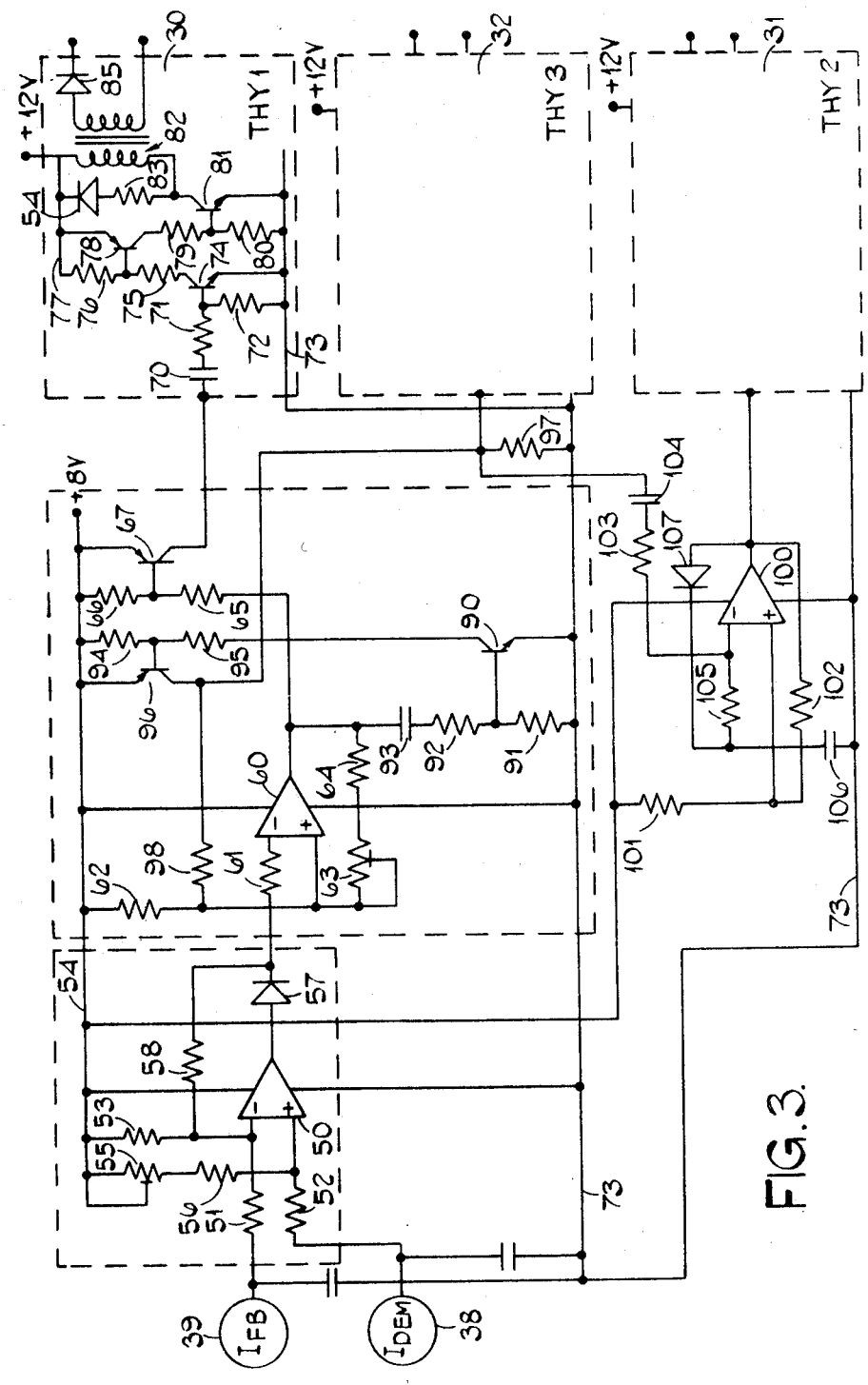
Figure 4:
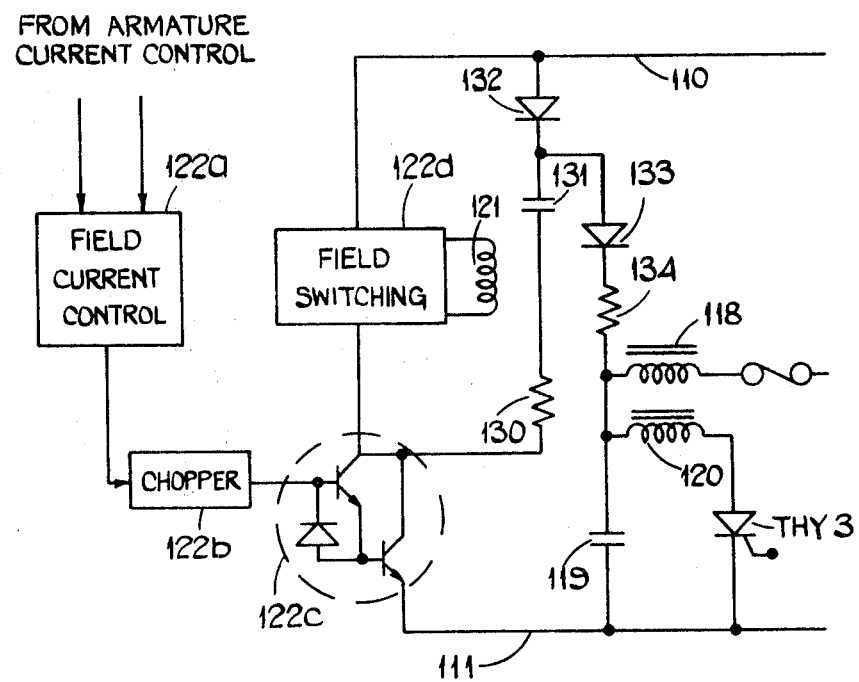

FIG. 1 is a circuit diagram of a thyristor chopper circuit for actually controlling the armature current of a battery vehicle d.c. motor, FIG. 2 is a block diagram of a control circuit for the thyristors of the circuit of FIG. 1, FIG. 3 is a more detailed circuit diagram of a part of the circuit of FIG. 1, and FIG. 4 is a diagram of a modified form of the invention.

The chopper circuit of FIG. 1 comprises high voltage positive and negative supply lines 10, 11. The armature 12 of a d.c. traction motor is connected at one side to a contact 13 which is closed by a control circuit (not shown) for motoring and opened for electrical braking, the contact 13 controlling connection of this side of the armature to the terminal 10. The other side of the armature is connected to the anode of a main thyristor THY 1., the cathode of which is connected by a fuse 14 to the terminal 11. A bypass diode 14 is connected with its anode connected to the anode of the thyristor THY 1 and its cathode connected to the line 10. The diode 14 serves to recirculate armature current when the contact 13 is open and the thyristor is turned off. The thyristor THY 1 is shunted by a capacitor 15 and a resistor 16 in series for interference suppression purposes. A further diode 17 is connected between said one side of the armature and the rail 11 to provide a path for braking current through the armature when the contact 13 is open (i.e. with the motor acting as a generator and the tnyristor THY 1 controlling the armature current in accordance with the braking effort demanded.

A second thyristor THY 2 which is referred to herein as a commutating thyristor has its anode connected to the anode of the main thyristor THY 1. The cathode of the commutating thyristor THY 2 is connected via an inductor 18 and a capacitor 19 in series to the rail 11. A third thyristor THY 3 has its cathode connected to the rail 11 and its anode connected by a further inductor 20 to the interconnection of the inductor 18 and the capacitor 19.

The function of the thyristor THY 3 and inductor is to reverse the voltage held on the capacitor 19 so that when the thyristor THY 2 is fired the cathode of the thyristor THY 2 is at a voltage lower than at the rail 11 and thereby ensure that armature current is adequately directed from the main thyristor THY 1 to permit the latter to switch on.

As mentioned above it is conventional to fire the main thyristor THY 1 and the third thyristor THY 3 simultaneously, but in the present case this is not done and, instead firing of thyristor THY 3 does not take place until it is actually required to fire the commutating thyristor THY 2. Then, firing of the commutating thyristor THY 2 is delayed briefly to ensure that voltage reversal of capacitor 19 has been completed and thyristor THY 3 has switched off.

To maintain the capacitor 19 fully charged there is provided a supplementary charging circuit consisting of a diode 22 and a resistor 23 of such large value that no significant charge can enter the capacitor 19 during the delay period referred, but nonetheless permitting sufficient charge to enter the capacitor 19 during the period between firing thyristor THY 1 and thyristor THY 3 to prevent the voltage on capacitor 19 from falling significantly below the full rail voltage.

FIG. 1 also showing the separate field winding 21 of the d.c. motor and its control circuit 22. However, since those elements do not form an essential part of the novelty of the present invention no detailed description will be given.

Turning now to FIG. 2, which is the schematic arrangement of the control circuit for the thyristors THY 1, THY 2, THY 3, each thyristor has an associated drive circuit 30, 31, 32 and these are controlled by a Schmidt bistable circuit 33. The drive circuit 30 is triggered through the intermediary of a falling edge detector circuit 34 and the circuit 32, for the thyristor THY 3 is triggered through the intermediary of a rising edge detector circuit 35, the same circuit 34 triggering the circuit 31 through a monostable delay circuit 36.

The Schmidt bistable circuit 33 is triggered by a differential amplifier 37 which receives one input from a current demand signal generator 38 and another from an armature current transducer 39.

Although the actual details of the generator 38 are not pertinent to the present invention, it is sufficient to note that it receives input signals from circuits operated by an accelerator pedal 40 and a brake pedal 41 which also operate various logic circuits (not shown) to drive contactors (not shown) for varying the connections of the field winding 21 and the armature 12 (contact 13 being a part of one of these contactors). The generator 38 also has an input from a speed transducer which varies the limits between which the accelerator and brake pedals 40 and 41 can have effect.

Returning now to the differential amplifier 37, in steady state conditions this produces a triangular voltage wave form as the actual measured armature current rises after firing of the thyristor THY 1 and falls after firing of thyristor THY 2. The Schmidt bistable 33 is switched between its two states at different levels of this triangular wave-form so that triggering of the thyristor in the required sequence is achieved.

Turning to the more detailed circuit diagram given in FIG. 3, the differential amplifier 37 is based on an operational amplifier 50 (which may be one of the four operational amplifiers contained in a National Semiconductors LM 3900 integrated circuit). The output of the armature current transducer is connected to the inverting input terminal of the amplifier 50 by a resistor 51 and the output of the current demand signal generator 38 is connected to the non-inverting input terminal by a resistor 52. A bias resistor 53 is connected between the positive supply rail 54 and the inverting input terminal and, for biasing the non-inverting terminal a resistor 55 and a variable resistor 56 are connected in series between it and the rail 54. A diode 57 has its anode connected to the output terminal of the amplifier 50 and its cathode provides the output of the differential amplifier stage, being connected by a feedback resistor 58 to the inverting input terminal to provide linear operation.

It will be appreciated that for a given level of current demand signal from the generator 38 the output of the differential amplifier will fall linearly with rising current from the transducer 39.

The Schmidt bistable circuit 33 is based on another operational amplifier 60 (also ¼ of an LM 3900 integrated circuit). The inverting input terminal of the amplifier 60 is connected by a resistor 61 to the cathode of the diode 57. The non-inverting input terminal of the amplifier 60 is connected to the rail 54 by a resistor 62 and to its own output terminal by means of a variable resistor 63 and a resistor 64 in series, to provide d.c. feedback which introduces hysteresis to obtain the two level switching referred to above.

The output terminal of the amplifier 60 is connected to the input terminal of the drive circuit 30 for thyristor THY 1 via a transistor inverting stage which includes a pair of resistors 65, 66 in series between the amplifier output terminal and the rail 54, and a pnp transistor 67 with its base connected to the common point of the resistors 65 and 66 and its emitter connected to the rail 54.

The collector of the transistor 67 is connected by a capacitor 70 and two resistors 71, 72 in series to an earth rail 73. The common point of the resistors 71, 72 is connected to the base of an npn transistor 74 which has its collector connected by two resistors 75, 76 in series to a supply rail 77, and its emitter connected to the rail 73. The transistor 74 switches on for a length of time following the transition of the output of the amplifier 60 from high to low determined by the values of the capacitor 70 and the resistors 71 and 72. A subsequent transition from low to high does not switch on the transistor 74 again. Thus the circuit 30 is triggered, as mentioned above, only by the falling edge of the Schmidt bistable output signal.

The common point of the resistors 75, 76 is connected to the base of a pnp transistor 78 which has its emitter connected to the rail 77 and its collector connected by two resistors 79, 80 in series to the rail 73. The common point of the resistors 79, 80 is connected to the base of an npn transistor 81 with its emitter connected to the rail 73 and its collector connected by the primary winding of a transformer 82 to the rail 77. A diode 84 and resistor 83 are connected in series across the primary winding of the transformer 82 to provide a recirculation path for current passing through the primary winding when transistor 81 is switched off. The secondary winding of the transformer 82 is connected in series with a diode 85 across the gate-cathode of the thyristor THY 1.

The circuits 31 and 32 are identical with the circuit 30 are not described in detail. For triggering the circuits 31, 32 however, a separate output is taken from the operational amplifier 60 via two transistor stages. The first such stage comprises an npn transistor 90 with its emitter connected to the rail 73 and its base connected to the common point of two registors 91, 92 connected in series with a capacitor 93 between the output terminal of the amplifier 60 and the rail 73 so that the transistor 90 is switched on following a rising transition in the amplifier 60 output for a time dependent on the values of capacitor 93 and resistors 91 and 92.

The second stage referred to includes two resistors 94, 95 connected in series between the collector of the transistor 90 and the rail 54, and a pnp transistor 96 with its base connected to the common point of the transistors 94 and 95 and its emitter connected to the rail 54. A load resistor 97 connects the collector of the transistor 96 to the earth rail 73.

To ensure that the Schmidt bistable circuit based on the amplifier 60 does not change stage whilst transistor 90 is switched on there is an additional feedback resistor 98 connected between the collector of the transistor 96 and the noninverting input terminal of the amplifier 60. This arrangement defines a minimum off time for the thyristor THY 1 since there cannot be a falling transition of the output of the circuit 60 whilst the capacitor 93 is still charging following a rising transition.

The collector of the transistor 96 is connected to the input terminal of the drive circuit 32 so that thyristor THY 3 is triggered when there is a rising transition of the output of the amplifier 60.

The monostable delay circuit 36 of FIG. 2 is based on yet another operational amplifier 100 (again ¼ of an LM3900 integrated circuit). This has a bias resistor 101 connecting its non-inverting input terminal to the rail 54 and a resistor 102 connecting its output terminal to its non-inverting input terminal. The inverting input terminal of the amplifier 100 is connected by a resistor 103 and capacitor 104 in series to the collector of the transistor 96 and by a resistor 105 and capacitor 106 in series to the rail 73. A diode 107 has its anode connected to the output terminal of the amplifier 100 and its cathode connected to the interconnection of the resistor 105 and the capacitor 106.

The monostable delay circuit is triggered by the rising transition of the voltage on the collector of the transistor 96 which causes a falling transition in the output of the amplifier 100. The output of the amplifier 100 stays low until the capacitor 106 (which had charged via the diode 107 in the preceding period when the output of amplifier 100 was high) discharges through the resistor 105 into the amplifier 100. At the end of this period the amplifier 100 output goes high and this rising transition triggers the circuit 31 to switch on the commutating thyristor THY2.

The minimum off time set by the capacitor 93 and resistors 91 and 92 is arranged to be sufficiently long to exceed the sum of the delay imposed by the monostable delay circuit 36 and the time taken for the capacitor 19 to re-charge through the commutating thyristor THY 2.

Referring finally to FIG. 4, the simple diode 22/resistor 23 shown in FIG. 1 can maintain the capacitor 19 voltage at a level only slightly less than the full rail voltage. In some applications, however, it may be desirable to maintain on capacitor 19 a voltage greater than the rail voltage.

As shown in FIG. 4 the output semi-conductor switch 122c of the field current control 122 is used to drive a diode pump circuit for maintaining the voltage on capacitor 119 (corresponding to capacitor 19 of FIG. 1). FIG. 4 shows the field current control 122 broken down into four separate units, namely a field current demand circuit 122a which receives inputs from the Schmitt bistable 33 and the armature current difference amplifier 37 of the armature current control of FIG. 2. Normally, at low speeds, the control 122a produces an output demanding maximum field current, but when the vehicle speed is such that the back emf generated by the rotation of the armature prevents the demanded armature current being reached, the output of the control 122a falls. At this stage the chopper circuit 122b commences reduction of the conduction of the semiconductor switch 122c, thereby reducing the average field current and permitting a higher armature current to flow. The semiconductor switch 122c is, in fact, a Darlington pair, with its emitter connected to the rail 111 and its collector connected to the field winding 121 via a switching matrix 122d, which is not relevant to the present invention.

The diode pump circuit referred to above includes a resistor 130 and a capacitor 131 connected in series between the collector or the Darlington pair 122c and the cathode of a diode 132. The anode of the diode 132 is connected to the + rail 110. A diode 133 has its anode connected to the cathode of the diode 132 and its cathode connected by a resistor 134 to the capacitor 119.

When the Darlington pair 122c is hard on capacitor 131 will charge via resistor 130 and diode 132. When the Darlington pair switches off the collector voltage of the Darlington pair rises rapidly to the voltage of the rail 110, thereby causing capacitor 131 to reverse bias diode 132. If the capacitor 119 has discharged sufficiently for its voltage to be less than that on the cathode of diode 132 at this stage, current will flow through the diode 133 and resistor 134 to replenish the charge on capacitor 119.

The voltage on capacitor 119 is thus maintained at a level in excess of the rail voltage.

I claim:

1. A d.c. motor control circuit for an electrically powered vehicle, in which the field winding current and armature current and controlled independently of one another by separate current control circuits, the armature current control circuit comprising:

(a) a main thyristor connected in series with the armature between a pair of supply terminals;

(b) a commutating thyristor, first inductor and capacitor connected in series across the main thyristor;

(c) a third thyristor connected in series with a second inductor across the capacitor;

(d) separate firing circuits for said main thyristor, commutating thyristor and third thyristor;

(e) means for generating an armature current demand signal;

(f) means sensitive to actual armature current for generating a feedback signal;

(g) trigger means controlled by said demand and feedback signals for triggering the firing circuit for the main thyristor when an increase in the actual armature current is demanded by said demand signal, said trigger means under control of said signals thereafter triggering the firing circuit for the third thyristor when a reduction in the actual armature current is demanded by said demand signal and then, after a fixed delay, triggering the firing circuit for the commutating thyristor, whereby the main thyristor is first, the third thyristor is fired next and the commutating thyristor is fired last; and (h) charging path means for said capacitor for maintaining the voltage across it at a level not significantly less than that between said supply terminals.

2. A d.c. motor control circuit as claimed in claim 1, in which said charging path means comprises a diode and a resistor connected in series between one of the supply terminals and said capacitor.

3. A d.c. motor control circuit as claimed in claim 2, in which said separate current control circuit for the field winding current comprises a field current chopper circuit, said charging path means including a diode pump circuit connecting the output of said field current chopper circuit to the capacitor.

4. A d.c. motor control circuit as claimed in claim 3, in which the chopper circuit includes an output semiconductor switch connected to one side to one supply terminal, one side of the commutating capacitor being connected to said one supply terminal, said diode pump circuit including a first resistor and a capacitor connected in series to the cathode of a first diode the anode of which is connected to the other supply terminal, a second diode having its anode connected to the cathode of the first diode and a second resistor connecting the cathode of said second diode to the other side of said commutating capacitor.

* * * * *